United States Patent
Namura et al.

(10) Patent No.: US 6,839,558 B2
(45) Date of Patent: *Jan. 4, 2005

(54) INTEGRATED CONTROL SYSTEM FOR RADIO SERVICE AREAS OF BASE STATIONS IN MOBILE COMMUNICATION SYSTEM

(75) Inventors: Mikiya Namura, Yokohama (JP); Masataka Ohta, Machida (JP); Toshiro Suzuki, Tama (JP)

(73) Assignee: Hitachi, Ltd., Tokyo (JP)

( * ) Notice: Subject to any disclaimer, the term of this patent is extended or adjusted under 35 U.S.C. 154(b) by 538 days.

This patent is subject to a terminal disclaimer.

(21) Appl. No.: 09/923,539

(22) Filed: Aug. 8, 2001

(65) Prior Publication Data

US 2002/0004406 A1 Jan. 10, 2002

Related U.S. Application Data

(63) Continuation of application No. 09/520,725, filed on Mar. 8, 2000, which is a division of application No. 08/947,347, filed on Oct. 8, 1997, now Pat. No. 6,112,081, which is a continuation of application No. 08/630,078, filed on Apr. 9, 1996, now abandoned.

(30) Foreign Application Priority Data

Apr. 13, 1995 (JP) .......................................... 07-087923

(51) Int. Cl.[7] .............................................. H04Q 7/20
(52) U.S. Cl. .................... 455/423; 455/424; 455/67.11; 455/561; 455/9
(58) Field of Search ................................ 455/423, 424, 455/515, 67.11, 67.13, 422, 450, 62, 631, 433, 560, 8, 9, 561, 453

(56) References Cited

U.S. PATENT DOCUMENTS 4,670,899 A * 6/1987 Brody et al. ................ 455/453

(List continued on next page.)

FOREIGN PATENT DOCUMENTS

| GB | 2288570 | 2/1995 |
|----|---------|--------|
| JP | 6090442 | 5/1985 |
| JP | 3-22632 | 1/1991 |
| JP | 3-117040 | 5/1991 |
| JP | 5-63635 | 3/1993 |
| JP | 5-259967 | 10/1993 |
| WO | 92/12601 | 7/1991 |
| WO | 92/16061 | 9/1992 |
| WO | 92/21182 | 11/1992 |

Primary Examiner—Quochien B. Vuong
Assistant Examiner—Lana Le
(74) Attorney, Agent, or Firm—Antonelli, Terry, Stout & Kraus, LLP

(57) ABSTRACT

A mobile communication system which includes an exchange, a plurality of base stations, and a plurality of radio telephone sets communicatable with the associated base stations. In order to suppress or reduce call loss caused by traffic congestion or by faulty one of the base stations, an uncommunicatable service area of the faulty base station is covered by the other working base stations. The exchange detects operation states of all the base stations, searches a base-station state pattern table within the exchange for base-station control data suitable for the operation states to read out the base-station control pattern, and transmits the read-out base-station control data to the base stations to cause radio service areas of the base stations to be set to have desired radiation patterns according to the read-out base-station control data.

8 Claims, 14 Drawing Sheets

U.S. PATENT DOCUMENTS

| | | | |
|---|---|---|---|
| 5,157,709 A | * 10/1992 | Ohteru | 455/63.1 |
| 5,241,685 A | * 8/1993 | Bodin et al. | 455/453 |
| 5,548,533 A | 8/1996 | Gao et al. | |
| 5,548,799 A | 8/1996 | Kobayashi et al. | |
| 5,953,669 A | * 9/1999 | Stratis et al. | 455/67.13 |
| 5,991,629 A | * 11/1999 | Agrawal et al. | 455/453 |
| 6,112,081 A | * 8/2000 | Namura et al. | 455/424 |
| 6,141,565 A | * 10/2000 | Feuerstein et al. | 455/560 |
| 6,141,566 A | * 10/2000 | Gerdisch et al. | 455/561 |
| 6,173,187 B1 | * 1/2001 | Salonaho et al. | 455/424 |
| 6,336,034 B1 | * 1/2002 | Namura et al. | 455/424 |
| 6,438,374 B1 | * 8/2002 | Bhat | 455/423 |
| 6,526,282 B1 | * 2/2003 | Kadoshima et al. | 455/453 |
| 6,584,330 B1 | * 6/2003 | Ruuska | 455/423 |
| 6,594,495 B2 | * 7/2003 | Salonaho et al. | 455/561 |
| 6,628,933 B1 | * 9/2003 | Humes | 455/453 |

* cited by examiner

FIG.16A

ANTENNA PHASE

| 0° | PHASE OF ANTENNA 1 |
| | PHASE OF ANTENNA 2 |
| | ⋮ |
| | PHASE OF ANTENNA m |
| 30° | PHASE OF ANTENNA 1 |
| | PHASE OF ANTENNA 2 |
| | ⋮ |
| 60° | PHASE OF ANTENNA 1 |
| | PHASE OF ANTENNA 2 |
| | ⋮ |
| ⋮ | ⋮ |
| 330° | PHASE OF ANTENNA 1 |
| | PHASE OF ANTENNA 2 |
| | ⋮ |

FIG.16B

OUTPUT

| 10 | xW |
| 20 | yW |
| ⋮ | ⋮ |

FIG.16C

SENSITIVITY

| 10 | -30dB |
| 20 | -20dB |
| ⋮ | ⋮ |

FIG.16D

THE NUMBER OF SLOTS

| k | S1 |
| l | S2 |
| m | S3 |

INTEGRATED CONTROL SYSTEM FOR RADIO SERVICE AREAS OF BASE STATIONS IN MOBILE COMMUNICATION SYSTEM

CROSS-REFERENCE TO RELATED APPLICATIONS

This application is a Continuation Application of U.S. application Ser. No. 09/520,725, filed on Mar. 8, 2000, which is a Division of U.S. application Ser. No. 08/947,347, filed on Oct. 8, 1997 now U.S. Pat. No. 6,112,081, which is a Continuation of U.S. application Ser. No. 08/630,078, filed Apr. 9, 1996, which is now abandoned.

BACKGROUND OF THE INVENTION

The present invention relates to a mobile communication system including an exchange, a plurality of base stations connected to the exchange and a multiplicity of radio telephone sets belonging to the radio service areas of these base stations, and more particularly, to a system for integratedly controlling the radio service areas of the base stations in the mobile communication system.

In a conventional mobile communication system, base stations are arranged with pre-assumed traffic so that, when there occur calls exceeding the assumed traffic from radio telephone sets, the connections are limited, causing call loss. In order to cope with such peak traffic, it has been necessary to increase the number of base stations. Further, when one of the base stations becomes faulty in operation, it becomes impossible to use the radio telephone sets belonging to a radio service area so far covered by the faulty base station, so long as the faulty base station is not repaired or replaced by a normal one.

In this way, with the above prior art mobile communication system, for the purpose of relieving the traffic congestion or the call loss caused by the faulty base station, it has been necessary to increase the number of base stations by newly installing them.

Meanwhile, there is already known a system in which an telephone exchange has such a function of monitoring load states of a plurality of base stations that, when detecting an overload of specific one of the base stations, the exchange changes the transmission outputs of directional antennas of the radio base light-loaded stations other than the overloaded station to distribute the overload to the light-loaded other base stations, as shown in JP-A-3-22632. Also as disclosed in JP-A-3-117040, there is already known a system that directional antennas having a variable output level are provided to respective base stations so that an area control station calculates latent traffics of traveling equipments for the respective base stations within a fixed time on the basis of the current positions, control zone numbers and other information of the respective base stations, and adjusts outputs of the directional antennas based on the calculated result to thereby level a call loss probability. Another system is disclosed in JP-A-5-63635 in which, when the traffic of a base station becomes higher, a transmission output of an outgoing control channel of the base station is reduced to decentralize the traffic to adjacent base stations. Also disclosed in JP-A-5-259967 is a method by which a multiplicity of waiting base station for use at the time of high traffic are previously prepared for base stations always in operation so that, at the time of the high traffic, the service areas of the working base station are reduced to operate the waiting base stations.

The aforementioned, known, prior art mobile communication system has had a defect that, when it is desired to avoid traffic congestion or to prevent call loss generated by a faulty base station, the system copes with it by increasing the number of base stations to be newly installed or by individually monitoring and controlling the respective base stations, which disadvantageously results in that the overall system cannot be efficiently operated.

SUMMARY OF THE INVENTION

It is accordingly an object of the present invention to provide a system for integratedly controlling radio service areas of base stations in a mobile communication system, which can suppress call loss in an existing system facility even when traffic congestion temporarily takes place.

Another object of the present invention is to provide a system for integratedly controlling radio service areas of base stations in a mobile communication system, in which, even when one or more of base stations in the system stop their operation, the other working base stations can cover the service area or areas of the stopped base station or stations which become inactive during exchange or repair of the stopped base station or stations to thereby suppress call loss.

In accordance with the present invention, the above object is attained by providing a mobile communication system in which an exchange monitors current operation states of all base stations to manage the operation states of the base stations, compares the operation states of the base stations with a plurality of base-station state patterns previously stored in the exchange, selects suitable one of the base-station state patterns, and then issues instructions to the respective base stations to cause radio service areas of the base stations to be set to have desired radiation patterns.

In accordance with an aspect of the present invention, each of the base stations has a function of changing its radiation pattern, transmission output or reception sensitivity, that is, of setting the radiation pattern, transmission output or reception sensitivity according to the base-station control data of radiation patterns received from the exchange.

In accordance with another aspect of the present invention, when one of the base stations stops its operation due to a line fault or the like, the exchange has a function of issuing instructions to the other base stations to change their radiation patterns, transmission outputs or reception sensitivities and to cause the other base stations to cover the service area of the faulty base station.

In accordance with yet another aspect of the present invention, the exchange has a function of, when failing to search for the state pattern of one of the base stations, informing of the search failure fact and also of entering a new state pattern as necessary.

In the mobile communication system of the present invention, when any of the base stations has traffic congestion or becomes faulty, the exchange issues instructions to the respective base stations to cause the base stations to controllably change their radiation patterns, transmission outputs or sensitivities of an array antenna. In this way, since the service areas of the base stations can be suitably reconfigured, the system can effectively make the most of an existing working facility while eliminating the need for additional extending provision of a line interface circuit in the exchange and for extending works involved, thus reducing call loss.

BRIEF DESCRIPTION OF THE DRAWINGS

FIGS. 16A to 16D are examples of management data tables of the base stations respectively.

DESCRIPTION OF THE PREFERRED EMBODIMENTS

An embodiment of the present invention will be explained with reference to the accompanying drawings.

Figure 1:
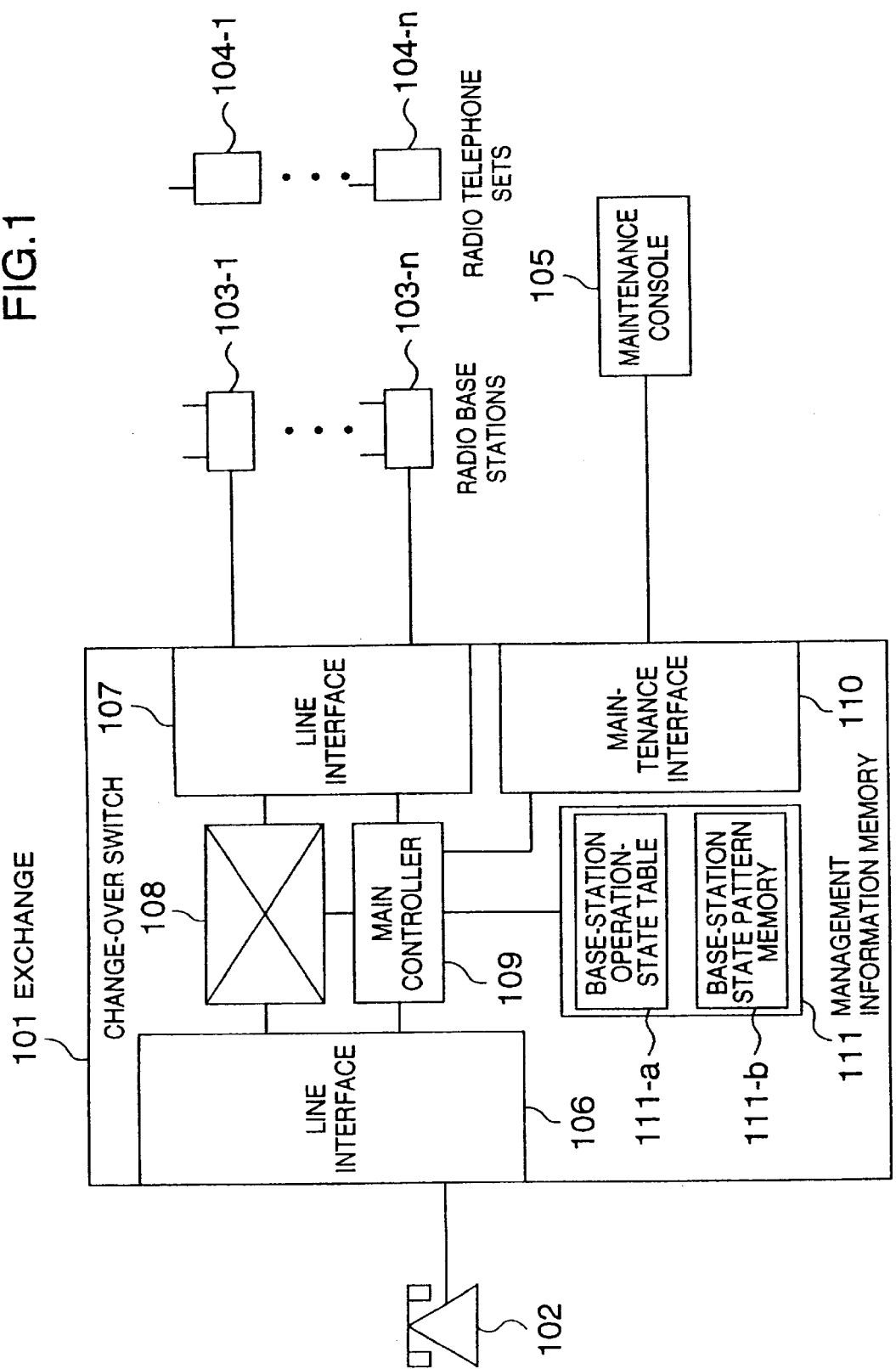
FIG. 1 is an arrangement of a mobile communication system in accordance with an embodiment of the present invention.

Referring first to FIG. 1, there is schematically shown an arrangement of a mobile communication system in accordance with an embodiment of the present invention. An exchange 101 shown in FIG. 1 includes line interfaces 106 and 107 connected with lines of a multiplicity of wired telephone sets (such as a telephone set 102) and with lines of base stations 103-1 to 103-n, a maintenance interface 110 connected with a console 105, a change-over switch 108, a main controller 109 for controlling the exchange, and a management information memory 111 for control of the base stations. The memory in turn has a base-station operation-state table 111-a indicative of the operational states of the respective base stations 103-1 to 103-n such as normal, traffic congestion or faulty states, and a base-station state pattern memory 111-b for recording therein a plurality of base station state patterns indicative of various types of operational states of the respective base stations and also for recording therein base station control data for control of radio service areas of the respective base stations prepared for the patterns.

Connected to the exchange 101 via the line interface 107 are the base stations 103-1 to 103-n which in turn are connected with radio telephone sets 104-1 to 104-n through spatial radio channels.

Such a terminal as the telephone set 102, which is connected to the line interface 106, can talk with a party. Further connected to the maintenance interface 110 is the console 105 on which maintenance information can be displayed.

Figure 2:
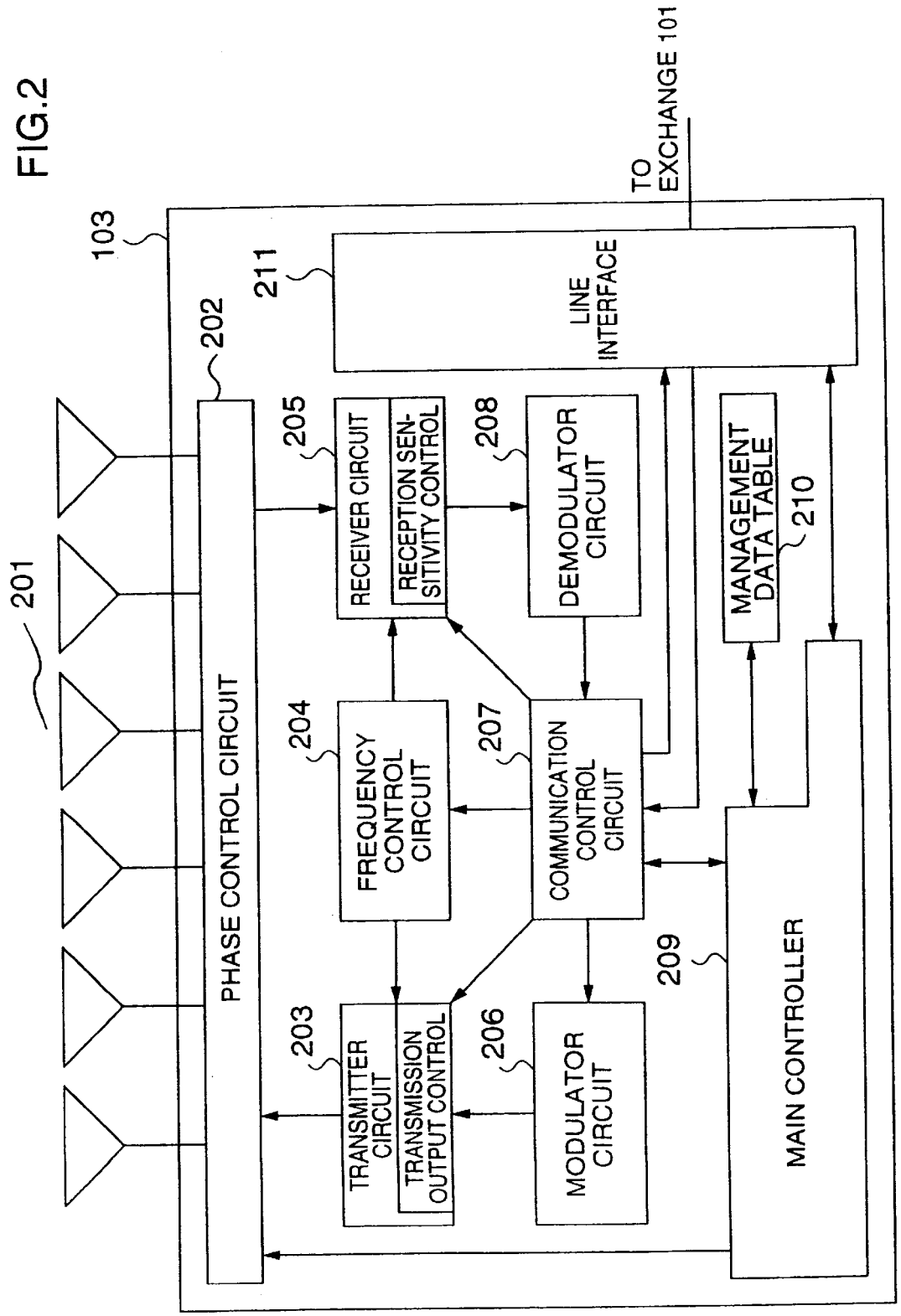
FIG. 2 is a block diagram showing a structure of a base station.

Shown in FIG. 2 shows a structure of one 103 of the base stations 103-1 to 103-n. The base station 103 is a connector which is connected to the exchange 101 in FIG. 1 for communication between the radio telephone set 104 and exchange 101. The base station 103 is connected to the exchange 101 through a wired line and connected to the radio telephone set 104 through a spatial radio channel. The base station 103 has an array of antennas 201 whose radio radiation pattern is controlled by a phase control circuit 202 by a well known method. The base station 103 has a transmitter circuit 203 having a function of controlling a transmission output; a receiver circuit 205 having a function of controlling a reception sensitivity; a frequency control circuit 204 for determining frequencies of the transmitter and receiver circuits 203 and 205; a communication control circuit 207 for performing control over the transmission/reception of communication data and in a time division multiple access (TDMA) system, over time slot, transmission output and sensitivity; a modulator circuit 206 for subjecting data received from a communication control circuit 207 to a modulation and sending it to the transmitter circuit 203, a demodulator circuit 208 for subjecting a signal received at the demodulator circuit 208 to a demodulation and sending it to the communication control circuit 207, a main controller 209 for carrying out control over radio radiation patterns of the base stations and over the entire operations of the base stations; a management data table 210 for management of the radio radiation patterns; and a line interface 211 connected to the exchange for data transmission and reception.

FIGS. 3 to 6 shows examples of service areas covered by a plurality of the base stations 103-1 to 103-7 in the system of FIG. 1. Within each of the communicatable service areas 301-1 to 301-7 of the base stations 103-1 to 103-7, the associated radio telephone set 104 can perform telephone services such as incoming and outgoing calls, and when the telephone is located out of its service area, the telephone cannot perform its telephone function.

Figure 3:
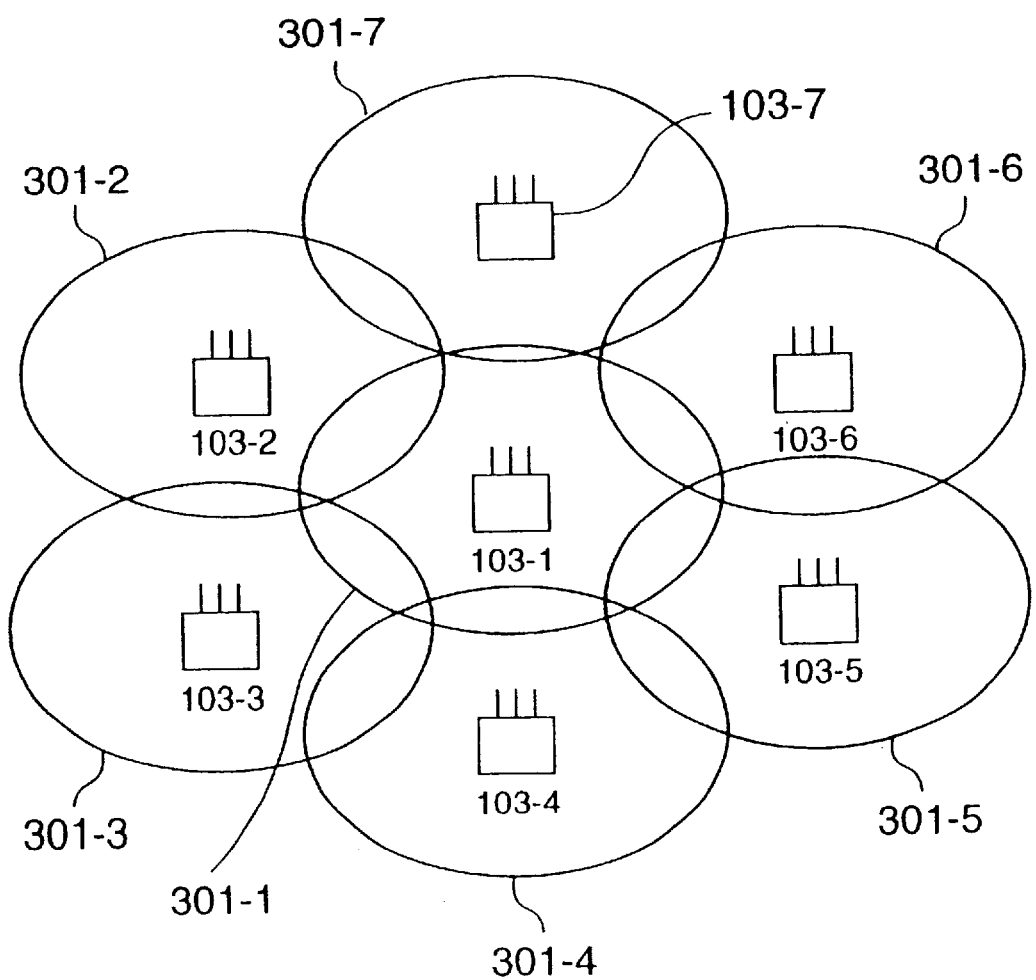
FIG. 3 shows an example of configuration of radio service areas of base stations in a normal mode.

FIG. 3 shows an example of configuration of the service areas in a normal mode. In this mode, the radio telephone set 104 can perform its incoming/outgoing call services in its service area, but the number of such radio telephone sets speech controllable by the single base station 103 has a limit. For example, in the service area 301-1 covered only by the base station 103-1, only a maximum m of radio telephone sets 104 can speech at the same time. In other words, even when there is an outgoing or incoming call to the (m+1)th radio telephone set 104, the base station 103-1 cannot handle the call because it is beyond its handling capability, which results in a call loss. In this way, when communication traffic becomes high, there may sometimes occur such a situation that, in spite of the fact that the radio telephone set is within its due service area, the telephone cannot perform its call services.

Figure 4:
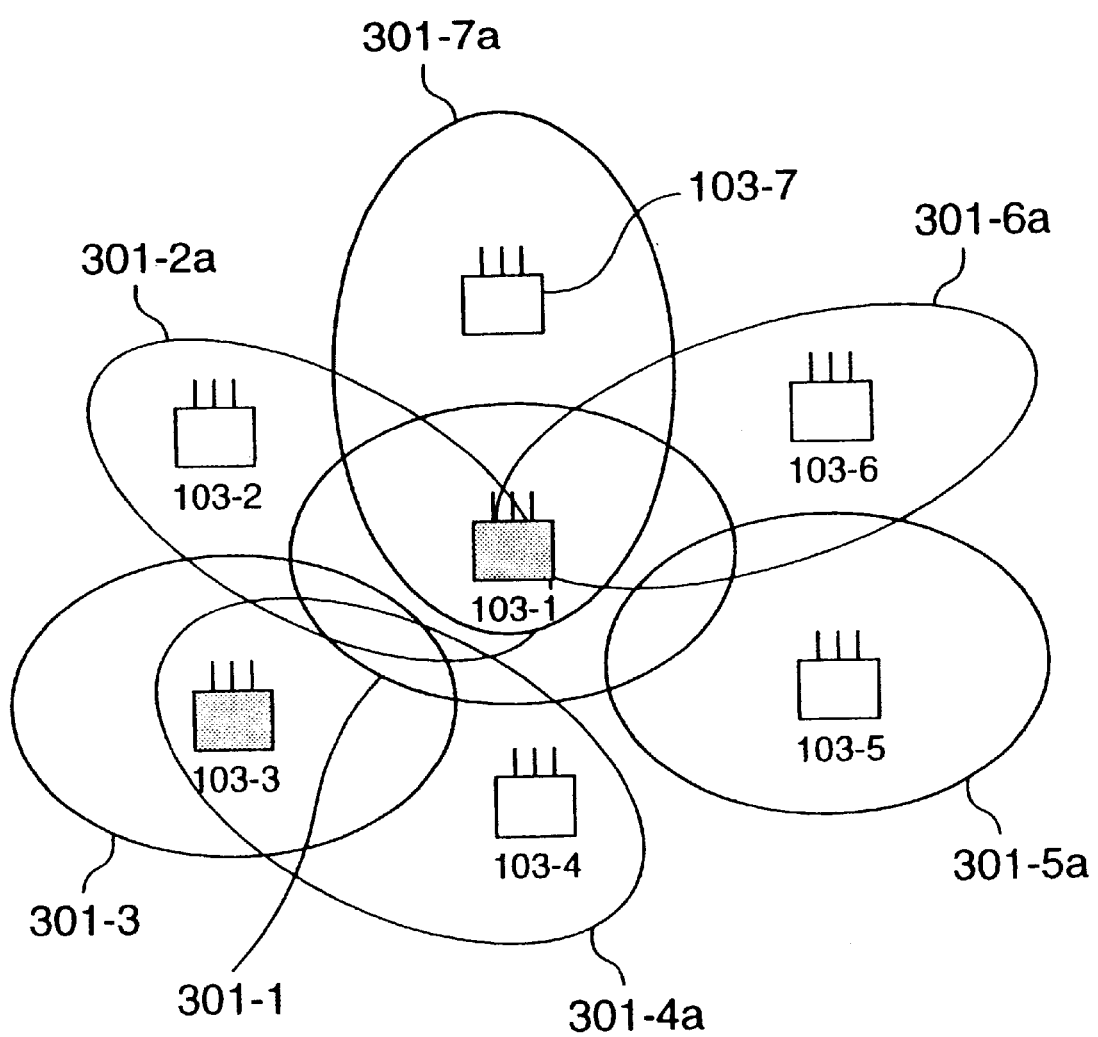
FIG. 4 shows an example of configuration of the radio service areas of the base stations when traffic becomes high.

For the purpose of preventing traffic congestion and avoiding such a situation as mentioned above, in accordance with the present invention, such a serve area configuration control as shown in FIG. 4 is carried out. Assume now that the traffics of the service areas 301-1 and 301-3 covered by the 2 base stations 103-1 and 103-3 become high so that the base stations alone cannot control all the radio telephone sets located within the service areas. Then the radio radiation patterns of the adjacent base stations 103-2, 103-4, 103-6 and 103-7 are changed so that the service areas of the adjacent base stations 103-2, 103-4, 103-6 and 103-7 are expanded toward the service areas 301-1 and 301-3 of the base stations 103-1 and 103-3 in such an extent that part zones of the service areas of only the base stations 103-1 and 103-3 are also overlapped by the service areas of the base stations 103-2, 103-4, 103-6 and 103-7. As a result, in the service area so far having the maximum m of telephones allowing simultaneous speech, the (m+1)th telephone or more can talk with parties at the same time so long as they are located in the above overlapped zones.

However, this also involves such a problem that the service area 301-2 is changed in shape to a service area 301-2a, the service area 301-4 is to a service area 301-4a, the service area 301-6 is to a service area 301-6a, and the service area 301-7 is to a service area 301-7a respectively; so that it is considered that some parts of the service areas so far covered in the normal mode become unserviceable.

To avoid this, when the base stations 103-2, 103-4, 103-6 and 103-7 are of the TDMA type for example, some of a plurality of time slots of the base stations are allocated to the original service areas 301-2, 301-4, 301-6 and 301-7 shown in FIG. 3 while the residual slots are allocated to the service areas 301-2a, 301-4a, 301-6a and 301-7a shown after the change in FIG. 4. This time slot allocating operation will next be explained. The main controller 209 reads out control signals for time slot, etc. from the management data table 210 on the basis of base station control data received from the exchange 101, and then supplies the read-out control signals to the communication control circuit 207 and phase control circuit 202. The communication control circuit 207 controls the transmission output of the transmitter circuit 203 for each of the allocated time slots, while the phase control circuit 202 controls the phase of power to be supplied to each of the antennas for each of the allocated time slots to thereby control the radio radiation patterns. In this way the radio radiation patterns are alternately changed over for each of the allocated time slots.

Figure 5:
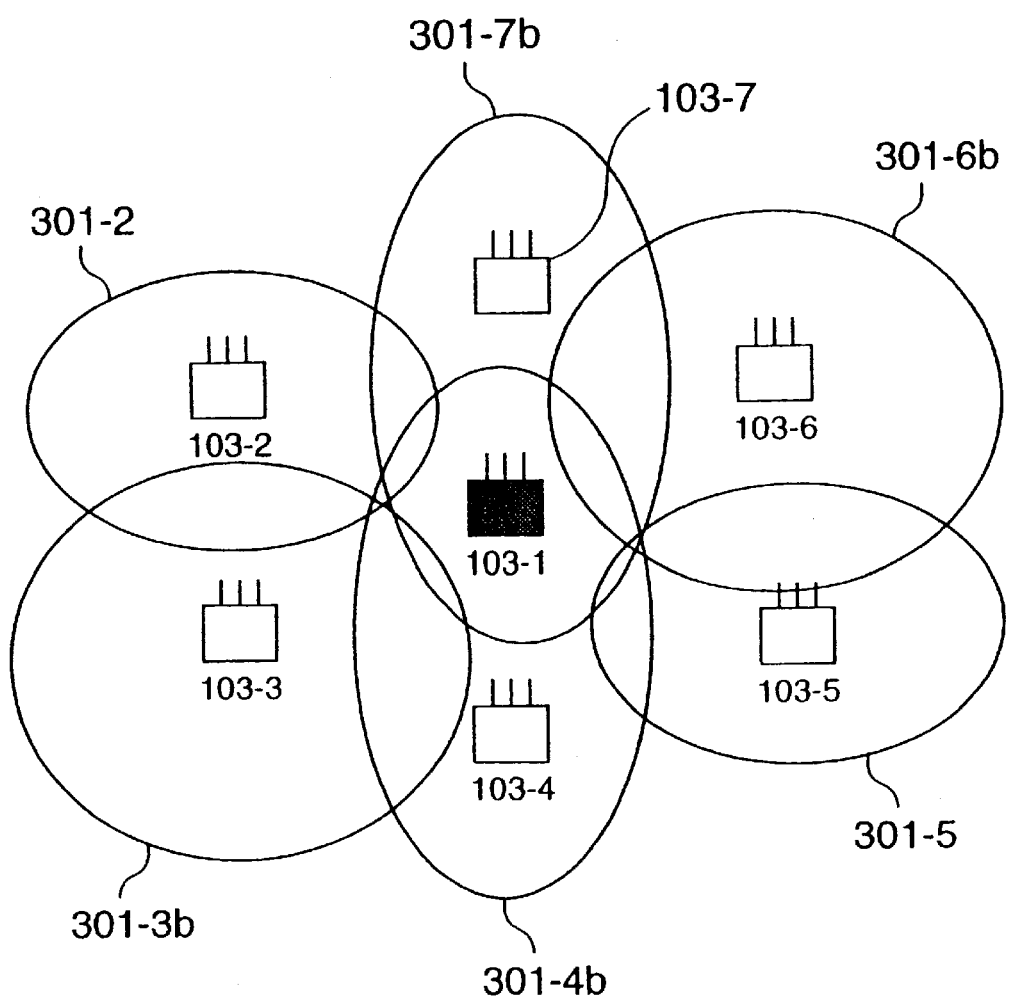
FIG. 5 shows an example of configuration of the radio service areas of the base stations when one of the base stations became faulty.

Shown in FIG. 5 is a configuration of service areas when the base station 103-1 is stopped due to its fault. When the base station 103-1 stops its operation, this causes the radio telephone set 104 usable only within the service area 301-1 in FIG. 3 to become unusable. To avoid this, the service area 301-7 is changed to a service area 301-7b and the service area 301-4 is changed to a service area 301-4b to provide different radio radiation patterns, whereas the service area 301-3 is expanded to a service area 301-3b and the service area 301-6 is expanded to a service area 301-6b by increasing the outputs of the associated base stations to obtain the large service areas. As a result, even when the base station 103-1 becomes faulty and stops its operation, the radio telephone set can use in its due service area of the faulty base station without being regarded as out of the service area, during which the faulty base station 103-1 can be replaced by a normal one or repaired, minimizing the damage to the user. Even in this case, a trouble caused by the change of the service area shape is considered as in FIG. 4. However, this trouble can be solved as in the above case by alternately changing over the radio radiation patterns for each of the allocated time slots on the basis of the control data.

Figure 6:
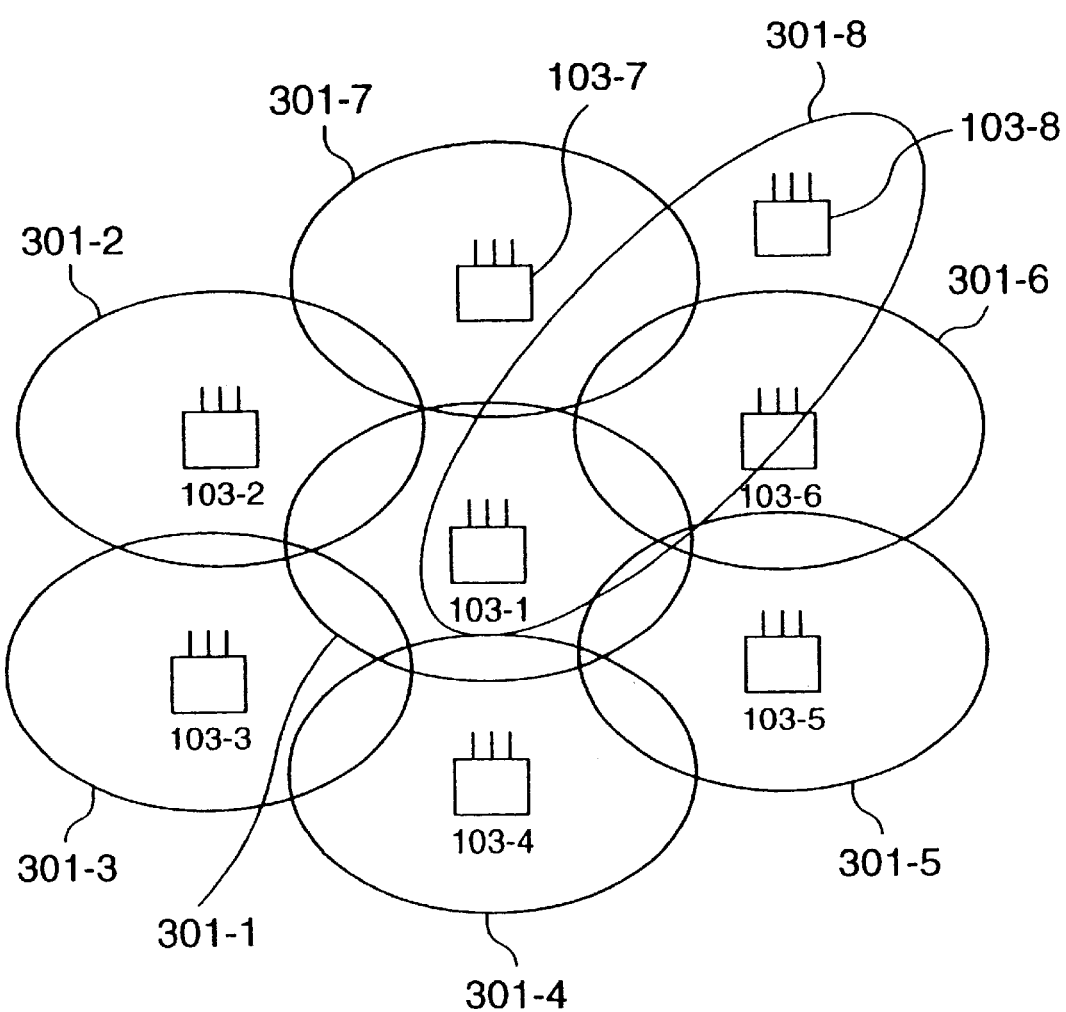
FIG. 6 shows an example of configuration of the radio service areas of the base stations when a preliminary base station is operated.

FIG. 6 is an example of configuration of service areas using the preliminary base station 103-8 designed to be operated exclusively when traffic is increased or when the base station 103 stops its operation to prevent call loss beforehand. For example, when the traffic of the service area 301-1 covered by the base station 103-1 becomes high, the radio radiation directivity of the preliminary base station 103-8 is directed toward the base station 103-1 so that, in the service area 301-1, the radio telephone set can use under control of both the base station 103-1 and the preliminary base station 103-8. When any of the base stations 103 becomes faulty, the same explanation holds true for it.

The summary of the system operation from FIG. 3 to FIG. 6 will be explained by referring to FIG. 7 and subsequent drawings.

Figures 7, 8:
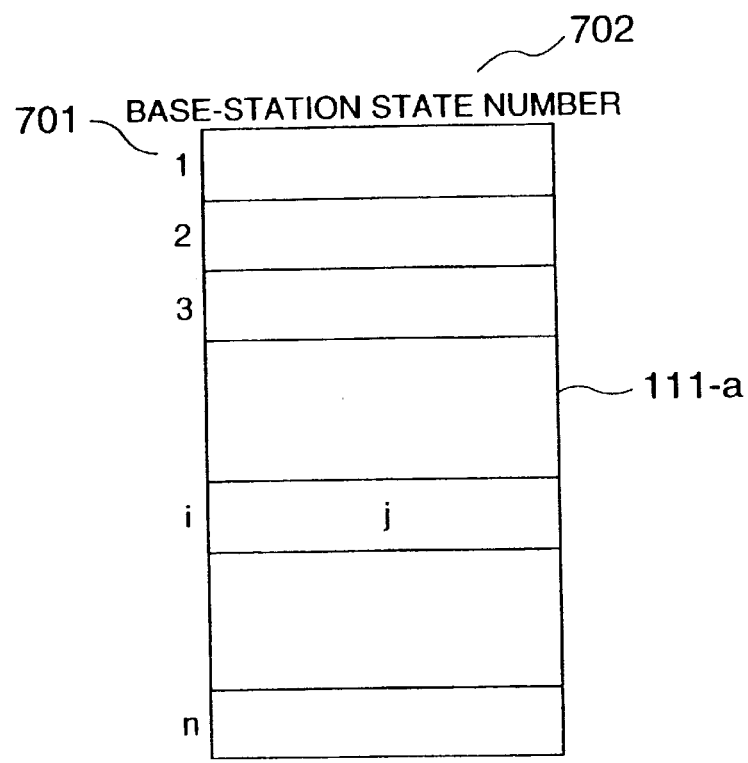
FIG. 7 shows an exemplary radio-base-station-state pattern table for management of states of all the base stations.
FIG. 8 shows a base-station-state pattern table for management of state patterns of the base stations.

Turning to FIG. 7, there is shown a base-station operation-state table 111-a which is located within the management information memory 111 of the exchange 101 and which shows the current operation states of all the registered base stations 103. That is, when the operation states of the base stations are managed by operation state numbers 702 of the base stations for respective base station numbers 701 thereof, the entire system operation state, i.e., the operation states of the respective base stations 103. The state numbers, which include "0" indicative of a normal state, "1" indicative of a congestion state or traffic congestion, "2" indicative of a fault state and "3" indicative of other state, are used for management.

Shown in FIG. 8 is a base-station state pattern table 800 which is located within the base-station state pattern memory and which shows the states of all the base stations in the form of a plurality of patterns. In this table, the states of all the base stations are set by base-station state numbers 802 as associated with base station numbers 801 for each pattern, each pattern being managed by an associated pattern number 803.

The base-station state numbers 802, as in the operation state numbers 702 already explained in FIG. 7, include "0" indicative of a normal state, "1" indicative of a traffic congestion state, "2" indicative of a fault state and "3" indicative of other state. In this table, a plurality of possible patterns of the system are registered for each of the pattern numbers 803.

For example, when the base stations having the base station numbers 801 of 1, 2 and 10 are installed at such locations as meeting places that many people temporarily get together, the base-station state numbers 802 of the base stations having the base station numbers 801 of 1, 2 and 10 are all set at "1" and the base-station state numbers 802 of the other base stations are set at "0", which is called a pattern 1. Similarly, when the base stations 103 having the base station numbers 801 of 30 to 45 are installed at such locations as stations that many people flock together, the state numbers of the base stations having the base station numbers 801 of 30 to 45 are set at "1" and the base-station state numbers of the other base stations are set at "0" (assuming that 30<i<45<n), which is called a pattern 2.

When such a pattern is created that the base-station state number 802 of one of the base stations having the base station number 801 is set at "2" and the base-station state numbers 802 of the other base stations are set at "0", taking into consideration the fact that any one of the base stations 103 becomes faulty; the number of such patterns corresponds to that of the base-station state numbers 802. FIG. 8 shows its more detailed example when such a case as shown in FIG. 4 is registered as a pattern 8 and such a case as shown in FIG. 5 is as a pattern 9. Therefore, the base station numbers 801 of 1 and 3 are set at "1" in the former pattern 8, the base station number 801 of 1 is set at "2" in the latter pattern 9, and the other base station numbers 801 are set at "0" in the other patterns.

Figure 9:
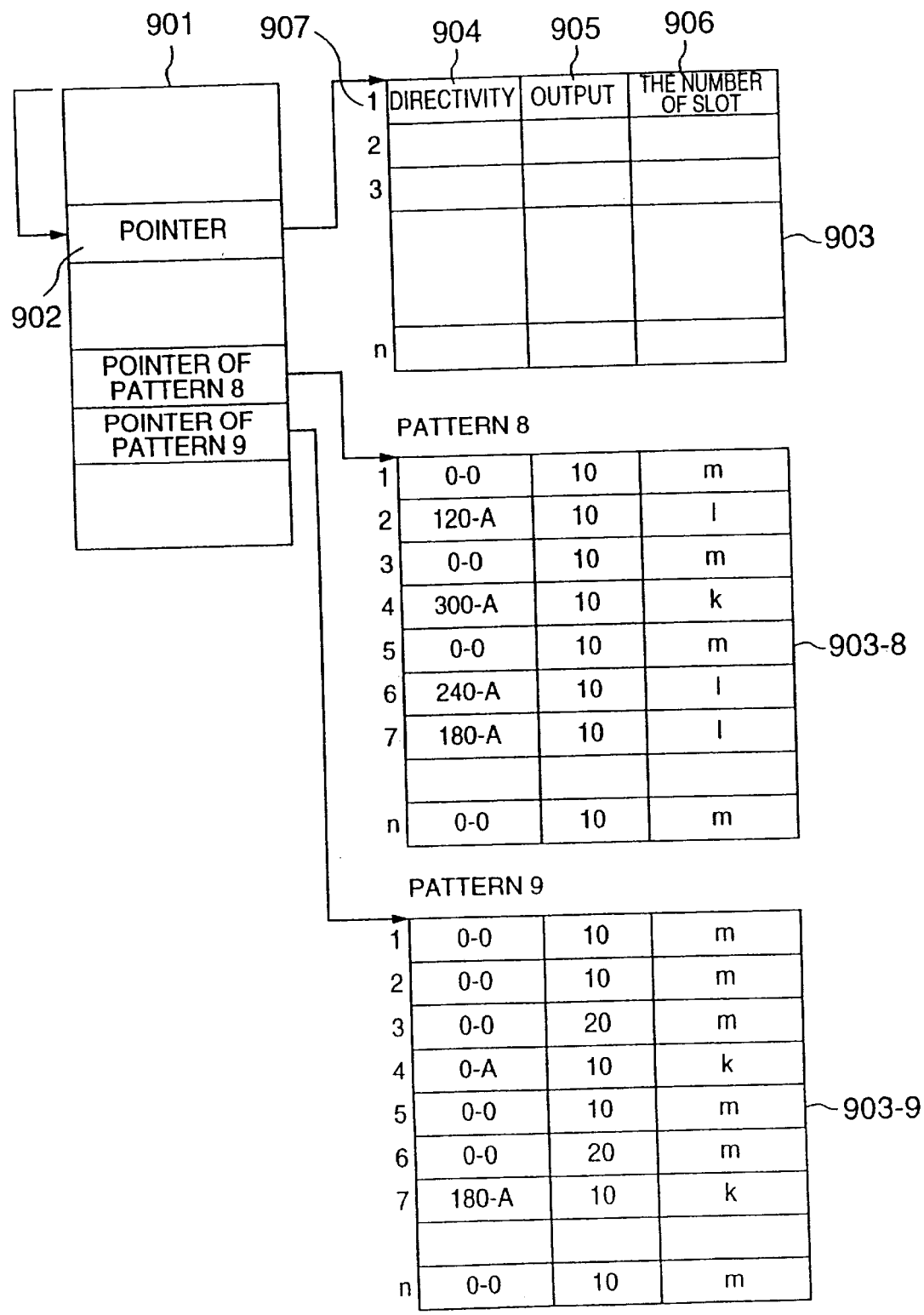
FIG. 9 shows a base-station control data table for management of control data of the base stations.

FIG. 9 shows how control parameters of the base stations are indexed to the pattern numbers 803 and how control data are managed. An index table 901, which is present in the base-station state pattern memory 111-*b* in FIG. 1, records therein pattern number pointers for searching a base-station control data table 903 with respect to the respective pattern numbers, whereby the base-station control data table 903 is indexed. The base-station control data table 903, which is present in the base-station state pattern memory 111-*b*, stores therein directivity data 904, output control data 905 and corresponding the number of slots data 906 with respect to respective base-station numbers 907.

The directivity data as used herein, which refers to the direction of the radiation pattern, is expressed in terms of "0-0" for non-directivity (radiation pattern of the base stations shown in FIG. 3) and in terms of corresponding parameters for a given directivity.

The output control data as used herein, which refers to transmission outputs of radio waves radiated from the base stations 103, is expressed based on "10" as a standard transmission output value.

The corresponding the number of slots data 906 indicate the number of slots corresponding to the patterns specified by the directivity data 904 and the output control data 905.

As detailed examples, the patterns 8 and 9 were given in the drawing. More in detail, with respect to the pattern 8, directivities are given to the base stations having the base station numbers of 2, 4, 6 and 7 as shown in FIG. 4, so that the directivity data 904 corresponding to the stations are expressed by parameters of "120", "300", "240" and "180" as clockwise turned with the north direction (upper direction in the drawing) set at "0", which are followed by hyphen(-) and then by "A" indicative of the presence of the patter direction. In the case of absence of the directivity or non-directivity, "A" is replaced by "0".

The number of slots data 906 has 3 types of the number of slots m, l and k, and the maximum number of slots m satisfies a relationship of m>l>k. With regard to the pattern 8 (base-station control data table 903-8), the base stations having the base-station numbers 907 of 1, 3, 5 and n have the number of slots m, the non-directivity of "0-0" and the output control data 905 of "10", set therein. The base stations having the base-station numbers 907 of 2, 4, 6 and 7 have the number of slots k or l, the directivity represented by "A" (indicative of presence of directivity) and the output control data 905 of "10", set therein. The remaining base stations 907 have the number of slots m-k or m-l, the directivity of "0-0" (indicative of absence of directivity or non-directivity) and the output control data 905 of "10" (standard output), set therein.

With respect to the pattern 9 (base-station control data table 903-9), as in the case of the pattern 8, directivities are given to the base stations of 4 and 7, that is, "0-A" and "180-A" are set therefor. Meanwhile, no direction is given to the base stations of 3 and 6 and thus the stations have the directivity data 904 of "0-0", but have the output control data 905 of "20" in place of the standard output "10" to expand their service areas. When the transmission output 905 is set at "20", this causes not only the output to be increased but also the sensitivity to be also enhanced correspondingly.

Figure 10:
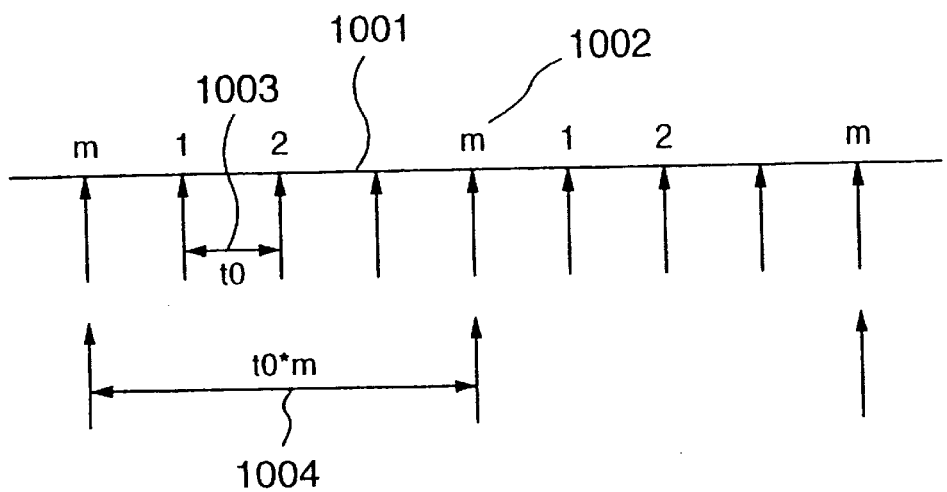
FIG. 10 is a diagram for explaining how to calculate channel use frequencies of the base stations.
Figure 11:
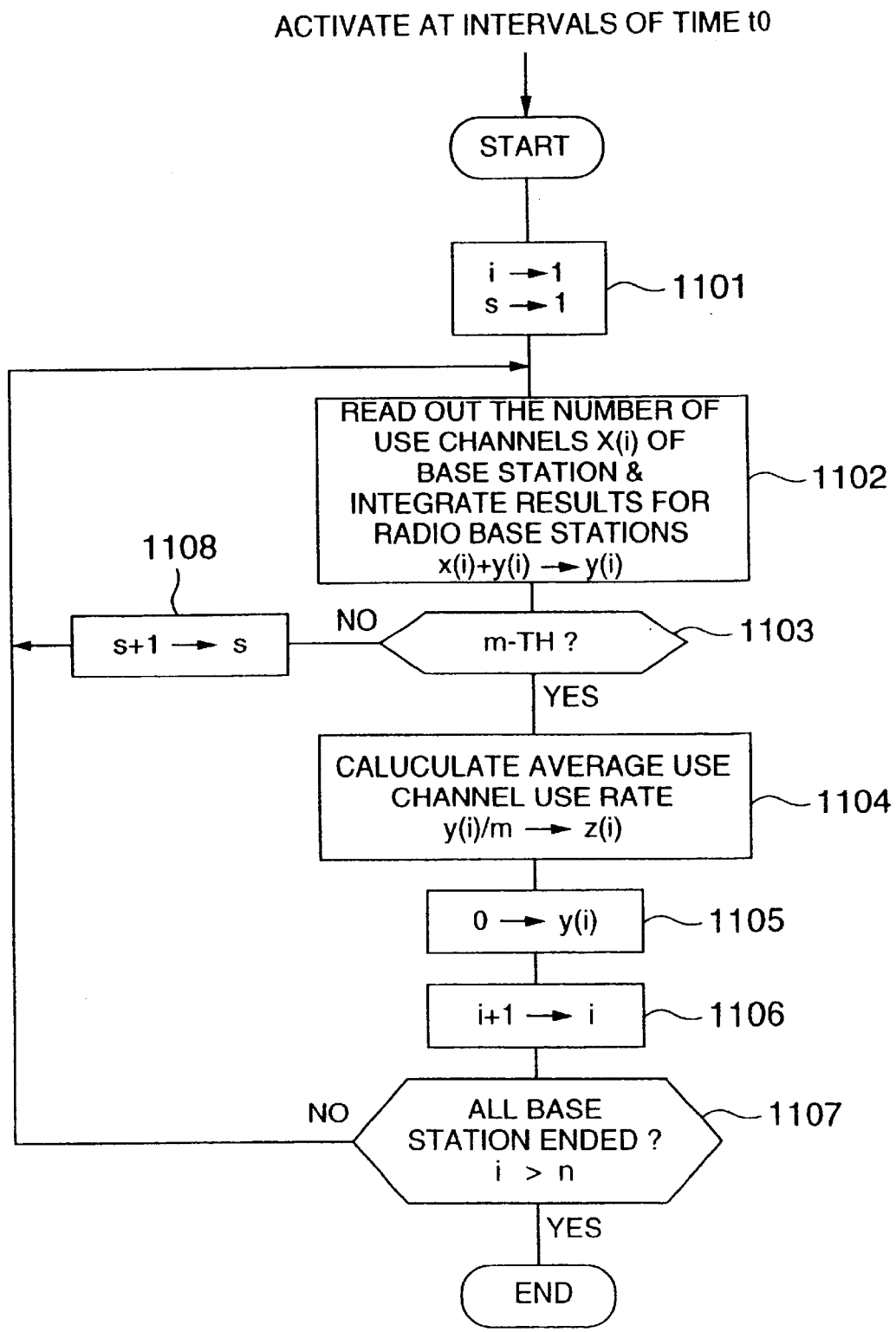
FIG. 11 is a flowchart for explaining the channel use frequency calculating operation of the base stations.

FIGS. 10 and 11 show how to measure channel use frequencies of the respective base stations 103 or traffics. The respective base stations 103 successively transmit the number of use channels to the exchange 101, and the number of use channels are recorded and updated in the management information memory 111 with respect to the respective base stations. More specifically, FIG. 10 is a diagram for explaining how to calculate the channel use frequencies of the base stations 103 based on the operation of the main controller 109, in which drawing a time axis 1001 is sampled at intervals of a sampling period 1003 of $t_0$ to search the channel use frequencies of the base stations 103 for each sampling period. These channel use frequencies are integrated over a predetermined sampling frequency 1002, that is, sampling duration 1004 of $t_0*m$ to find an average.

Shown in FIG. 11 is a flowchart for explaining the operation of each time duration $t_0$. In the drawing, the main controller substitutes an initial value 1 for a base-station number i and a sampling frequency S (step 1101), reads out a current number of use channels X(i) of the base-station number i from the management information memory 111, and integrates it as Y(i) in the memory 111 for each base-station number i (step 1102). The main controller judges at a next step 1103 whether or not the sampling frequency S arrived at m. If not then the main controller increments the sampling frequency S (step 1108), and returns to the step 1102 to wait for the next sampling operation to be done at intervals of the sampling period $t_0$.

When the main controller judges at the step 1103 to be YES, this means that the integration up to a predetermined sampling frequency m has been completed. Thus, the main controller divides the integrated value Y(i) by the sampling frequency m to calculate the number of average use channels and then calculate a channel use frequency Z(i) on the basis of the number of average use channels, and then records it in the management information memory 111. Then the main controller clears the integrated value Y(i) at a step 1105, increments the base-station number i at a step 1106, and judges whether or not the calculation of the channel use frequencies of all the base stations has been completed (step 1107). When judging at the step 1107 to be NO, the main controller returns to the step 1102; whereas, when judging to be YES, the main controller terminates the calculating operation.

As has been explained in the foregoing, the main controller records the traffics of the respective base stations in the memory 111 in the form of the channel use frequency Z(i) according to such a flowchart as shown in FIG. 11.

When detecting a fault in any of the base stations 103 in a conventionally known way, the main controller 209 informs the exchange 101 of the fault occurrence by sending a message generated by the controller itself to the exchange. The exchange, when informed of the fault occurrence, records the fault fact in the memory 111. When there is a base station which cannot communicate with the exchange, the exchange records the base station as a faulty station in the memory 111.

Figure 12:
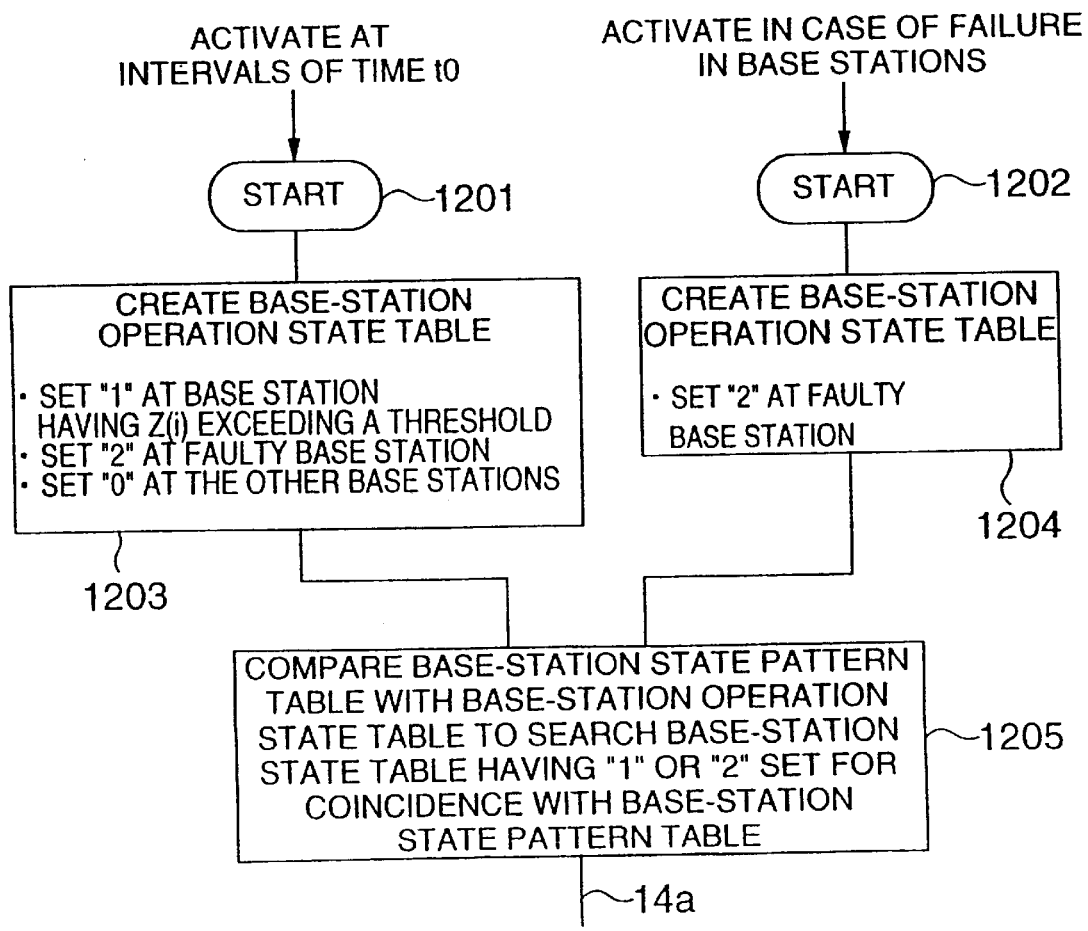
FIG. 12 is a flowchart for explaining the former half of the operation of the system when traffic is increased or one of the base stations becomes faulty.
Figure 13:
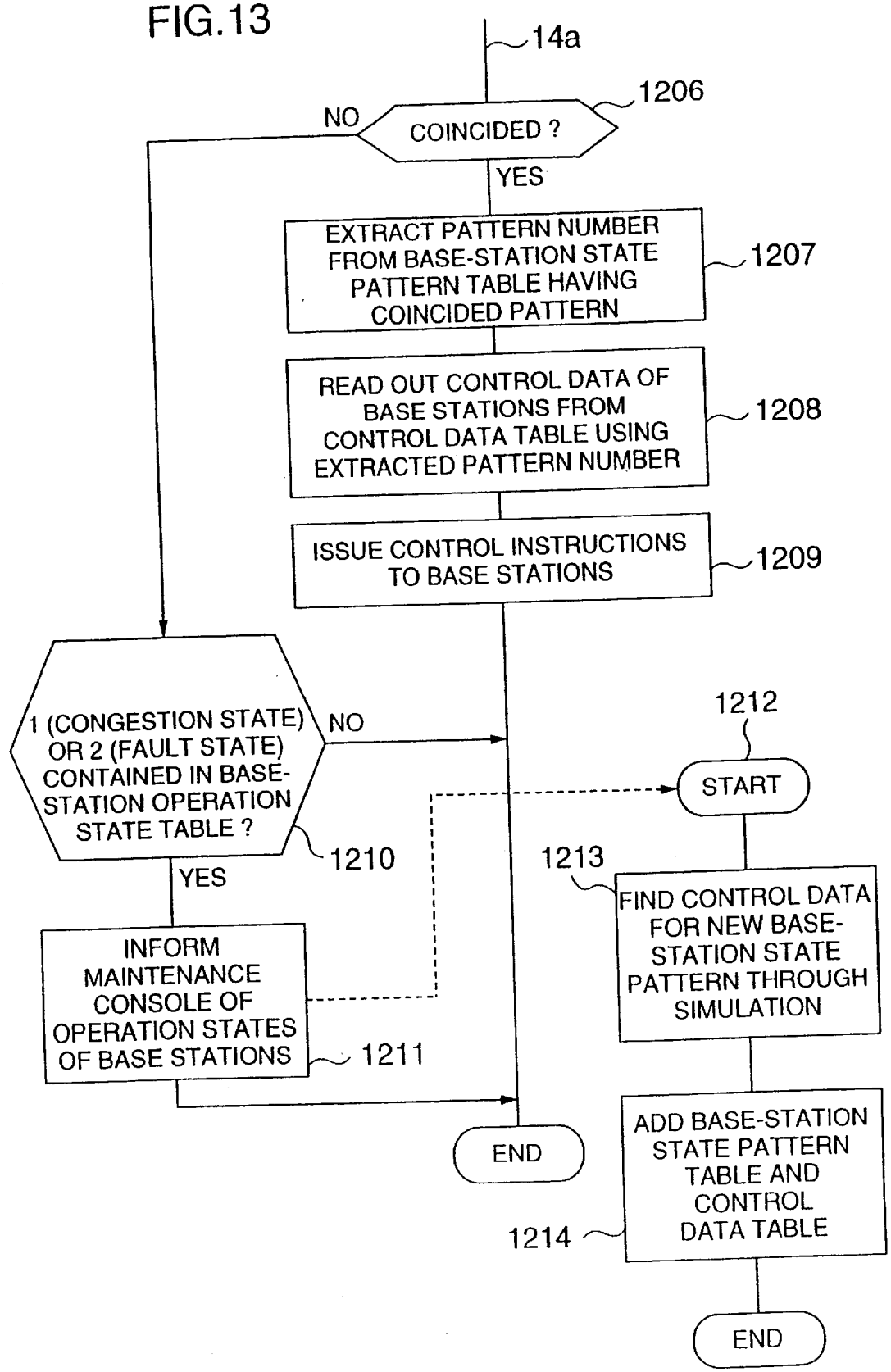
FIG. 13 is a flowchart for explaining the latter half of the operation of the system when traffic is increased or one of the base stations becomes faulty.

FIGS. 12 and 13 show a flowchart for explaining how the exchange 101 transmits control data to the respective base stations to control the radio service areas in the system shown in FIGS. 7 to 11. The operation of the flowchart is executed under the control of the main controller 109.

In the flowchart of FIG. 12, the exchange starts its operation at a step 1201 and sequentially reads out information on the base stations recorded in the memory 111 at a step 1203. The base-station operation-state table 111-a shown in FIG. 7 is created at the step 1203 on the basis of the read-out base station information. That is, at the step 1203, the exchange sets the base-station state number 701 at "2" for the base station registered as the faulty station. When the channel use frequency Z(i) calculated at the step 1104 already explained in FIG. 11 exceeds a predetermined threshold at the step 1203, the exchange sets "1" for the base station number 701 of the base station 103 having the exceeded channel use frequency, and also sets "0" for the other base stations in normal operation. In this way, the base-station operation-state table 111-a is created. When detecting a fault in any of the base stations, in order to quickly cope with it, the exchange issues at a step 1202 an interrupt start, sets "2" for corresponding one of the base station numbers corresponding to the faulty base station at a step 1204, and also records the fault occurrence in the management information memory 111 at the operation state recording part of the faulty station. In this connection, the fault detection is carried out by the exchange, when failing to perform normal communication with the base station, judges it as a faulty station.

After completing the creation of the base-station operation-state table 111-a in this way, the exchange collates the base-station operation-state table 111-a with the base-station state pattern table 800 at a step 1205.

That is, when collating the base-station operation-state table 111-a with the base-station state pattern table 800 and extracting a coincided pattern at the steps 1205 and 1206, the exchange extracts the pattern number 803 of the coincided pattern at a step 1207. The exchange, using the pattern number 803 extracted at the step 1207, indexes the base-station control data table 903 from the index table 901, and determines the directivity data 904 and output control data 905 of the respective base stations 103 as the control data. Based on the determined control data, the exchange 101 issues control instructions to the respective base stations 103.

When failing at the step 1206 to find any coincided pattern, the exchange searches the base-station operation-state table 111-a for the presence of "1" or "2" in the base-station state number 703 (step 1210). In the case of absence of "1" or "2" in the base-station state number 703, the exchange will issue no control instructions to the base stations 103 because of unnecessary control thereof. In the case of presence of "1" or "2" in the base-station state number 703, the exchange regards it as a new pattern was generated, and informs the maintenance console 105 of a generation alarm and its state (step 1211).

When informed of the generation alarm and its state at the step 1211, the operator of the console must register the generated pattern in the base-station operation-state table 111-a as a new pattern. To this end, the console goes to a step 1212. The console operator finds such a control pattern that produces the minimum call loss under the condition informed at the step 1211 (step 1213), registers the new pattern in the base-station state pattern memory 111-b, and registers pointers in the index table 901 and the base-station control data table 903 and output control data 905 in the base-station control data table 903 so as to be able to cope with generation of a new second pattern.

Figure 14:
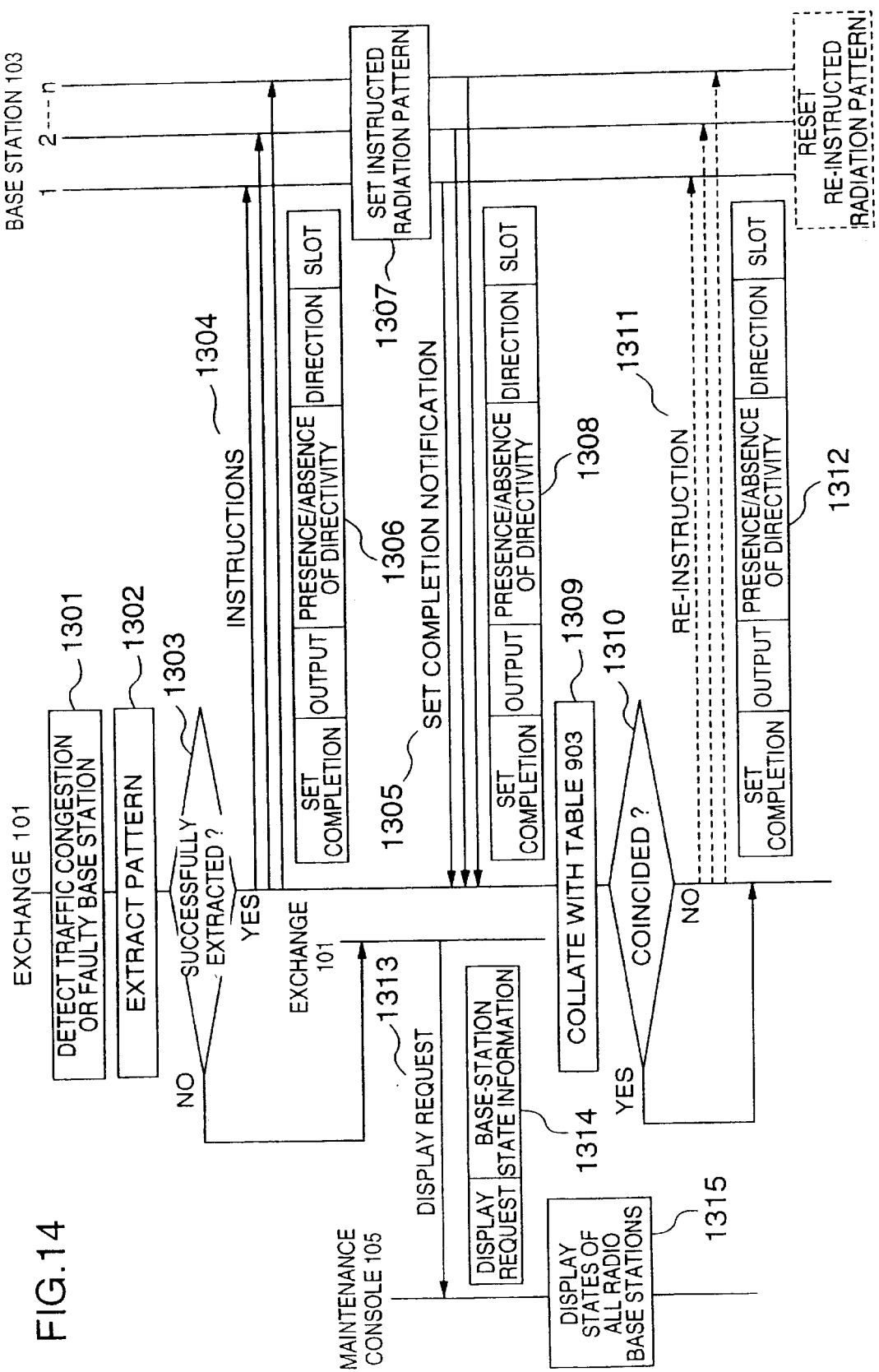
FIG. 14 is a sequence of major operations between an exchange and the base stations.

FIG. 14 shows an operational sequence of signal transfer between the exchange 101 and the respective base stations 103. In the drawing, the exchange first detects traffic congestion or a fault in the base stations 103 during the operation of FIG. 12 (step 1301). The exchange collates the base-station operation-state table 111-a with the base-station state pattern table 800. When extracting a coincided pattern as a result of the collation (step 1303), the exchange reads out the corresponding base-station control data table 903, issues an instruction 1304 to associated one of the base stations necessary for changing the operation state to cause the base station in question to be operated with a new radiation pattern, and also transmits control data 1306 thereto as a set request message for the new radiation pattern. The set request message includes, in its format, "set request" as message type as well as "transmission output", "presence/absence of directivity", "directivity" and "the number of associated slots" as control data.

When receiving the set request message 1306, the base station 103 sets its radiation pattern according to the contents of the set request message 1306 (step 1307). After completing the setting, the base station 103 transmits a set completion message 1308 including data indicative of the set condition to the exchange 101 to inform the exchange of the set completion (step 1305). The set completion message 1308 is made up of "set completion" as its message type as well as information "output", "presence/absence of directivity" and "the number of associated slots" set by the base station 103. The exchange sequentially collates the set data of the set completion message 1308 with those in the base-station control data table 903. A coincidence therebetween causes the exchange to regard it as the set completion at a step 1310; whereas, non-coincidence causes the exchange to again issue a reset instruction 1311 to the base station 103 corresponding to the non-coincidence. In this case, the reset request instruction 1311 has the same contents as the above set request message 1306. In this connection, the base station performs its resetting operation based on the reset request message and its reset result may again be informed to the exchange if necessary. In the illustrated example, however, this re-notification to the exchange is not done.

Meanwhile, when failing to extract any coincided pattern at the step 1303, the exchange issues an instruction to the maintenance console 105 to cause the console to display thereon the states of all the base stations. A display request message 1314 for the display is made up of "display request" as its message type and information of the memory 111 on the operation states of the base stations. When receiving the information, the maintenance console displays the operation states of all the base stations 103 on its display screen. The console operator, while looking at the display, adds a new pattern in the base-station state pattern table 800 and creates a base-station control data table 903 corresponding to the new pattern.

In the explanation made in connection with FIGS. 12 to 14, when the exchange extracts the base-station state pattern or patterns coinciding with the contents of the base-station operation-state table 111-*a* from the base-station state pattern table, the exchange transmits the base-station control data corresponding to the extracted base-station state pattern or patterns to the associated base station or stations, whereby the service areas of the respective base stations are set. When failing to extract any coincided pattern, the exchange causes the maintenance console to display thereon the effect of the extraction failure to prepare a new pattern. However, when there are lots of base stations, preparation of patterns including all the base station states involves increase of a large number of patterns, which results in the fact that the number of such patterns has to be inevitably limited. For this reason, when the extraction of a pattern coincided with the base-station operation sate table from the base-station state pattern table unsuccessfully ends, it requires a lot of time. In such a case, when a new pattern is created every time, this is not adapted for the actual applications of the system of the present invention and thus the present system cannot be fully operated.

Figure 15:
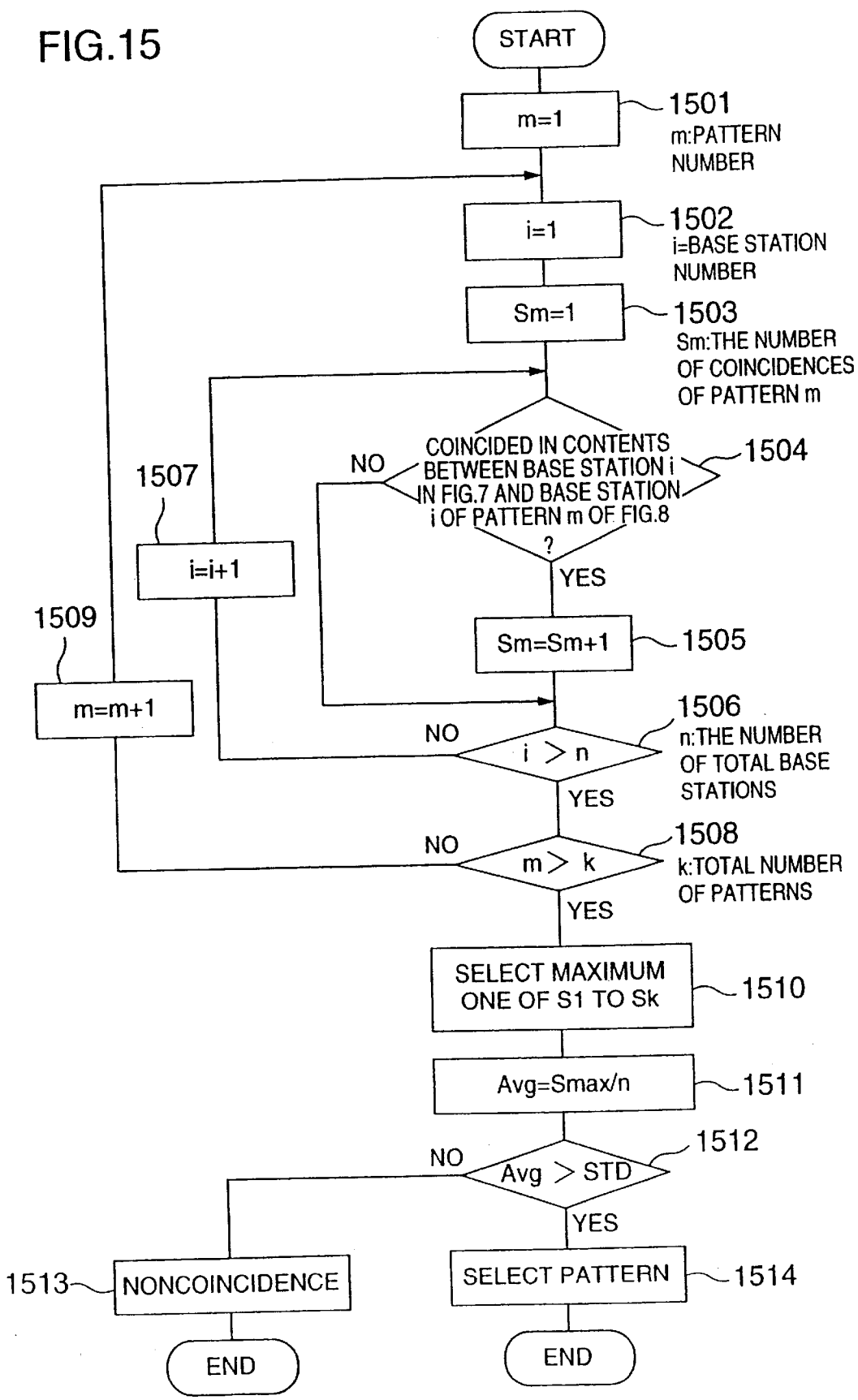
FIG. 15 is a flowchart showing the operation of another embodiment for selecting one of the base station state patterns suitable for the current operational states of all the base stations.

In view of such a respect, another embodiment of the present invention is provided, which operation is shown by a flowchart in FIG. 15 and corresponds to the details of the steps 1205 and 1206 in FIGS. 12 and 13 and of the steps 1302 and 1303 in FIG. 14. In the present embodiment, with respect to each pattern in the pattern table, a coincidence rate with the base-station operation state table is calculated, one of the patterns having the highest coincidence rate is selected, and the selected pattern is employed so long as the coincidence rate of the selected pattern exceeds a predetermined value.

In FIG. 15, when the system starts its operation, the system first sets "1" at m indicative of the pattern number 803 at a step 1501, sets "1" at i indicative of the base station number 801 at a step 1502, and also sets "0" at Sm indicative of the number of coincidences in the base-station state number between the base-station state patterns of the pattern number m and the base-station operation state table at a step 1503.

The system, at a step 1504, compares the contents of the base-station number i in the base-station operation state pattern of FIG. 7 with the contents of the base-station number i in the pattern number m of the base-station state pattern table of FIG. 8 and judges the presence or absence of any coincidence therebetween. Judgement of a coincidence therebetween causes the system to proceed to a step 1505 to increment the contents of the number of coincidences Sm by "1", and then the system goes to a step 1506. Judgement of non-coincidence at the step 1504 causes the system to proceed directly to the step 1506.

In the step 1506, the system judges whether or not the base-station number i exceeded the value n of the total number of base stations. When the judgement is NO, the system increments the base-station number i by "1", at a step 1507 and returns to the step 1504 to execute such operation as mentioned above. When completing the comparing operation for all the base stations, the system judges to be YES, stores the number of coincidences Sm of the base stations as it is at the step 1506, and then goes to a step 1508.

In the step 1508, the system judges whether or not the sampling frequency m exceeded the number of total patterns k. Judgement of NO causes the system to increment the sampling frequency m by "1" at a step 1509, to return to the step 1502, to set the base-station number i at "1" to resume the base stations of the next pattern number from the beginning, and then to set the number of coincidences Sm at "0" at the step 1503. In this way, when the system repeats such similar operations as mentioned above up to the number of total patterns k and finds the number of coincidences of from S1 to Sk, the system judges at a step 1508 to be YES and proceeds to a step 1510.

In the step 1510, the system selects maximum one of the number of coincidences S1 to Sk and sets it as Smax. The system then divides the maximum value Smax by the number of total base stations n to calculate a coincidence rate Avg at a step 1511. The system, in a step 1512, compares the coincidence rate Avg with a lowest coincidence rate STD which allows to regard as coincidence between the base-station operation state table and the selected pattern, and judges whether or not the coincidence rate Avg is larger than the lowest coincidence rate STD. Judgement of YES causes the system to select the base-station state pattern corresponding to the maximum coincidence rate Smax and to terminate the operation at a step 1514. Judgement of NO at the step 1512 causes the system to regard its as the absence of any coincided pattern and to terminate the operation at a step 1513.

Explanation will next be made as to how the base stations handle control data when the base stations receive the control data from the exchange 101.

When the respective base stations receive the control data from the exchange, the main controller 209 of each base station refers to the management data table 210 based on the received control data. The management data table contains an antenna phase table, an output table, a sensitivity table and a number of slots table shown in FIGS. 16A to 16D respectively.

The main controller 209, when receiving such a directional data "120-A" in the control data as shown in FIG. 9, searches the management data table 210 for a column of the antenna phase table of FIG. 16A shown by an arrow, reads out a transmission power phase signal of the respective antenna elements corresponding to 120 degree from the right column, and then sends it to the phase control circuit 202. The phase control circuit 202, on the basis of the received phase signal, controls the phase of transmission power to be sent to the respective antenna elements to thereby provide a desired radiation pattern. When receiving the control data associated with the output power, the main controller 209 refers to the output control data of the columns of FIG. 16B and 16C shown by arrows, and reads out a corresponding output power value (FIG. 16B) and a sensitivity value (FIG. 16C) of the right columns respectively. The main controller 209 sends the read-out output power value to the transmission output control part of the transmitter circuit 203 via the communication control circuit 207 to set a transmission output. The main controller 209, on the other hand, sends the read-out sensitivity value to the reception sensitivity control part of the receiver circuit 205 via the communication control circuit 207 to set a reception sensitivity for the received signal. Further, the main controller 209, when receiving the number of slots control data, refers to the column of FIG. 16D shown by an arrow, reads out a corresponding slot control signal from its right column, and then sends the slot control signal through the communication control circuit 207 to the transmitter circuit 203, frequency control circuit 204 and receiver circuit 205 to perform slot control in a known manner.

In accordance with the mobile communication system of the present invention, the service areas of the base stations are controlled to minimize the call loss generated by a change in the state of the system such as calling rate or by a fault in the base stations only with use of an existing operational facility, thereby reducing the possibility of inconvenience to users of the radio telephone sets.

What is claimed is:

1. A service area control method of a radio system including a exchange, a plurality of radio base stations connected to said exchange, and a plurality of mobile stations connected with said through wireless connection;

wherein said base station control station includes monitoring operation states of said plurality of radio base stations and instructing at least one of said radio base stations to control a radio-frequency radiation pattern thereof, when an abnormal operation state is detected in said radio base stations;

wherein said at least one of the radio base stations instructed by said exchange controls the radio-frequency radiation pattern on the basis of a control instruction from said exchange; and wherein said abnormal operation state includes a fault state.

2. A service area control method as claimed in claim 1, wherein said control instruction for the radio-frequency radiation pattern includes information relating to a directivity of the radio-frequency radiation.

3. A service area control method as claimed in claim 1, wherein said control instruction for the radio-frequency radiation pattern includes information relating to an intensity of a transmission power.

4. A service area control method as claimed in claim 3, wherein said at least one of the radio base stations instructed by said exchange controls a reception sensitivity thereof in accordance with the intensity of the transmission power, when said intensity of the transmission power is controlled.

5. A radio system comprising:

a exchange;

a plurality of radio base stations connected to said exchange; and a plurality of mobile stations connected with said radio base stations through wireless connection, wherein said exchange is configured to monitor operation states of said plurality of radio base stations and instruct at least one of said radio base stations to control a radio-frequency radiation pattern thereof, when an abnormal operation state is detected in said radio base stations;

wherein said at least one of the radio base stations instructed by said exchange is configured to control the radio-frequency radiation pattern on the basis of a control instruction from said exchange; and wherein said abnormal operation state includes a fault state.

6. A radio system as claimed in claim 5, wherein said control instruction for the radio-frequency radiation pattern includes information relating to a directivity of the radio-frequency radiation.

7. A radio system as claimed in claim 5, wherein said control instruction for the radio-frequency radiation pattern includes information relating to an intensity of a transmission power.

8. A radio system as claimed in claim 5, wherein said at least one of the radio base stations instructed by said exchange controls a reception sensitivity thereof in accordance with the intensity of the transmission power, when said intensity of the transmission power is controlled.

* * * * *